US009616842B2

(12) United States Patent
Ikeda et al.

(10) Patent No.: US 9,616,842 B2
(45) Date of Patent: Apr. 11, 2017

(54) VEHICLE HOOD STRUCTURE

(71) Applicant: TOYOTA JIDOSHA KABUSHIKI KAISHA, Toyota-shi, Aichi-ken (JP)

(72) Inventors: Koki Ikeda, Toyota (JP); Taichi Minei, Toyota (JP); Tatsuya Ayukawa, Toyota (JP)

(73) Assignee: TOYOTA JIDOSHA KABUHSIKI KAISHA, Toyota (JP)

( * ) Notice: Subject to any disclaimer, the term of this patent is extended or adjusted under 35 U.S.C. 154(b) by 0 days.

(21) Appl. No.: 14/857,043

(22) Filed: Sep. 17, 2015

(65) Prior Publication Data

US 2016/0096505 A1     Apr. 7, 2016

(30) Foreign Application Priority Data

Oct. 6, 2014  (JP) .................................. 2014-205863

(51) Int. Cl.
| | |
|---|---|
| *B62D 25/10* | (2006.01) |
| *B60R 21/34* | (2011.01) |
| *B62D 25/12* | (2006.01) |
| *B62D 29/00* | (2006.01) |

(52) U.S. Cl.
CPC ............ *B60R 21/34* (2013.01); *B62D 25/105* (2013.01); *B62D 25/12* (2013.01); *B62D 29/005* (2013.01); *B60R 2021/343* (2013.01)

(58) Field of Classification Search
CPC ........ B62D 25/10; B62D 25/105; B60R 21/34
USPC ......... 296/193.11, 187.03–187.05; 180/69.2, 180/69.21; 188/371, 376–377; 280/748, 280/751, 752
See application file for complete search history.

(56) References Cited

U.S. PATENT DOCUMENTS

| | | | |
|---|---|---|---|
| 7,281,597 B2 * | 10/2007 | Pellillo ................ | B62D 21/152 180/69.1 |
| 2013/0313860 A1 * | 11/2013 | Yamaji ................. | B62D 25/20 296/193.07 |

FOREIGN PATENT DOCUMENTS

| | | |
|---|---|---|
| DE | 100 38 812 A1 | 2/2002 |
| EP | 1 504 985 A1 | 2/2005 |
| JP | 2000-203378 A | 7/2000 |
| JP | 2002-046651 A | 2/2002 |
| JP | 2004-136810 A | 5/2004 |
| JP | 2007-168585 A | 7/2007 |
| JP | 2008-302883 | * 12/2008 |
| JP | 2011-195080 A | 10/2011 |
| JP | 2014-004893 A | 1/2014 |

(Continued)

OTHER PUBLICATIONS

Mar. 16, 2016 Extended Search Report issued in European Patent Application No. 15187979.8.

*Primary Examiner* — Dennis H Pedder
(74) *Attorney, Agent, or Firm* — Oliff PLC

(57) ABSTRACT

A vehicle hood structure including a hood outer panel and a hood inner panel, wherein the hood inner panel is made from a resin, is disposed at a hood lower side of the hood outer panel, is joined to the hood outer panel, and includes a general portion, plural ribs and a weakened portion, wherein: the general portion has a general face that faces the hood outer panel, the plural ribs project out from the general portion toward the hood outer panel side and extend along the general face, and are set at intervals in either a hood width direction or a hood front-rear direction, and the weakened portion is formed at the ribs and extends along an extension direction of the ribs.

5 Claims, 13 Drawing Sheets

(56) References Cited

FOREIGN PATENT DOCUMENTS

| JP | 2014-024525 A | 2/2014 |
|----|---------------|--------|
| WO | 2007/054671 A1 | 5/2007 |

\* cited by examiner

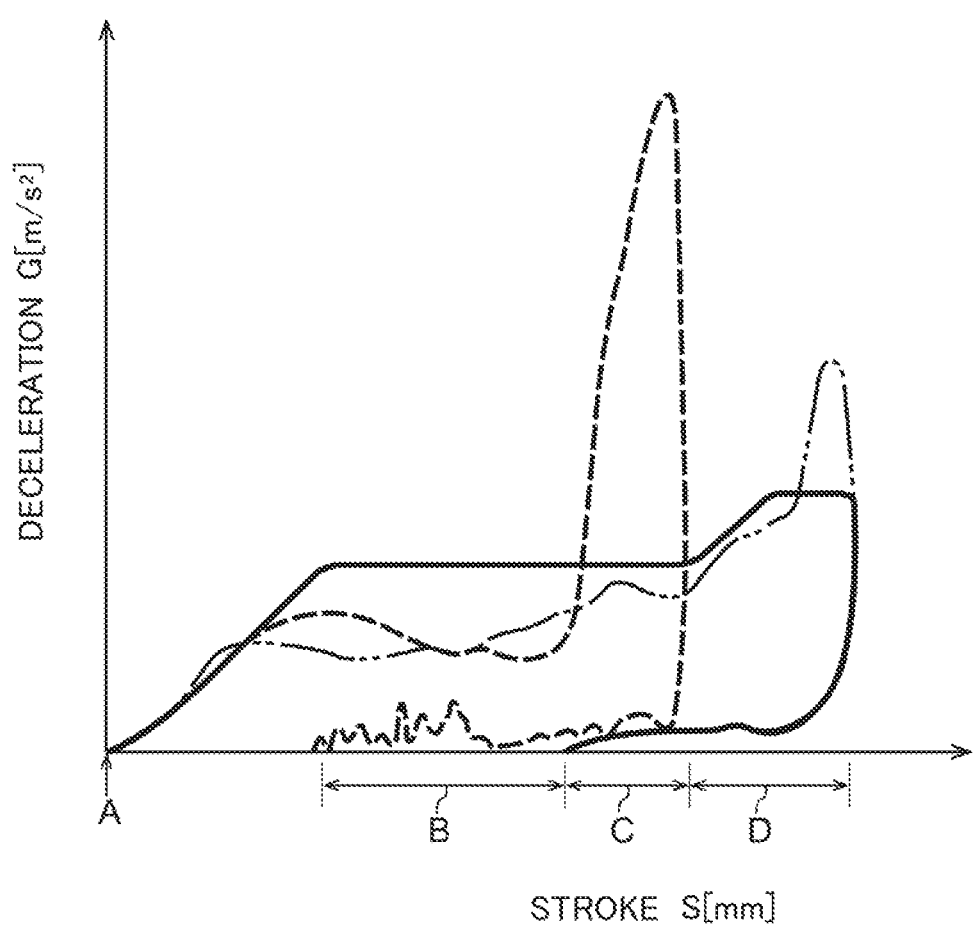

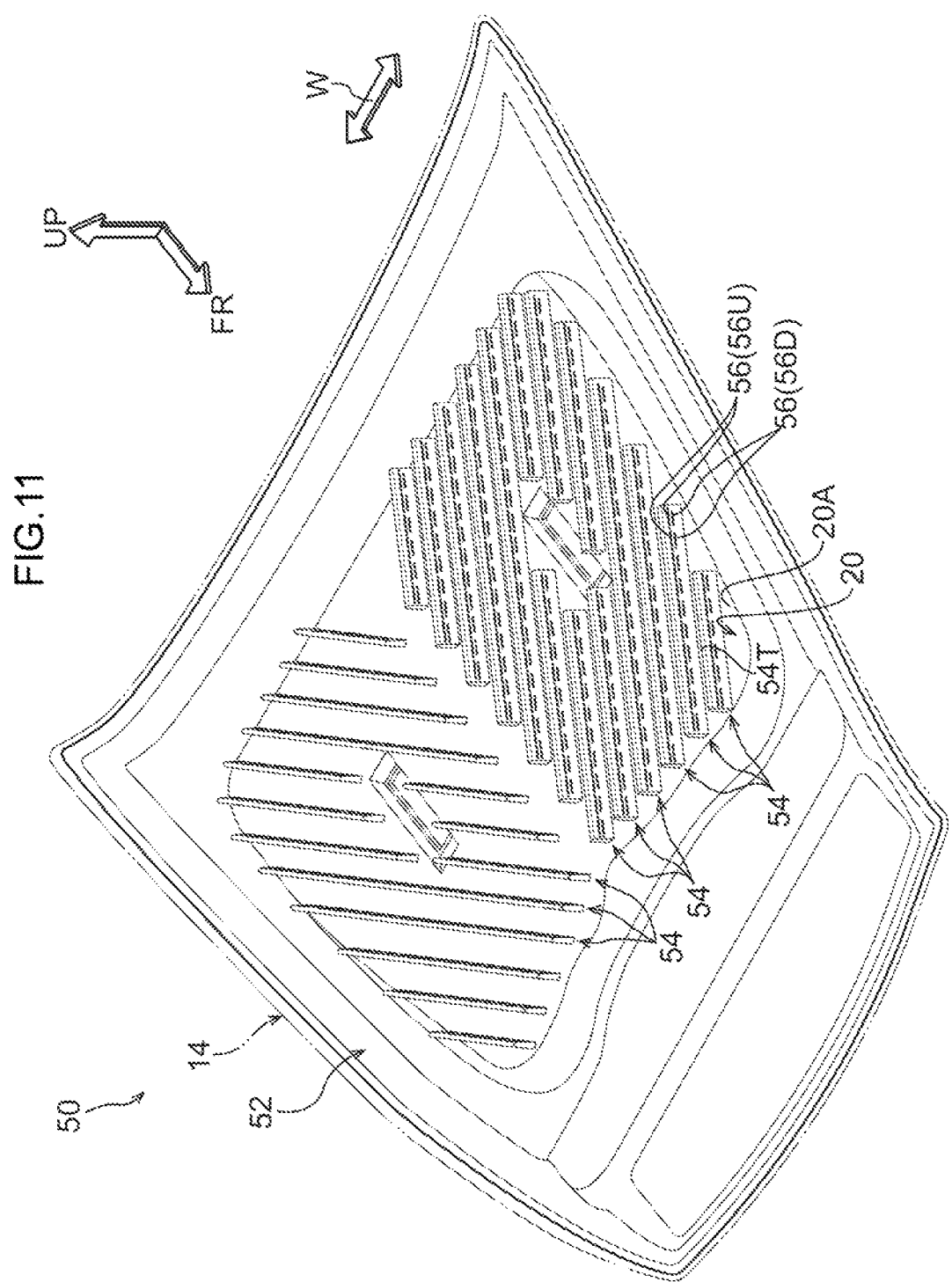

VEHICLE HOOD STRUCTURE

CROSS-REFERENCE TO RELATED APPLICATION

This application claims priority under 35 USC 119 from Japanese Patent Application No. 2014-205863 filed on Oct. 6, 2014, the disclosure of which is incorporated by reference herein.

BACKGROUND

Technical Field

An exemplary embodiment of the present invention relates to a vehicle hood structure.

Description of the Related Art

Japanese Patent Application Laid-Open (JP-A) No. 2014-24525 describes a structure in which a vehicle hood applied with a resin panel member from the perspective of weight reduction is provided with ribs for collision absorption. Explained briefly, an upper side panel member (hood outer panel) and a lower side panel member (hood inner panel) are joined together so as to form an enclosed space, and plural longitudinal ribs formed to a lower face of the upper side panel member and plural lateral ribs formed to an upper face of the lower side panel member are disposed in an intersecting pattern and engage with each other.

SUMMARY OF THE INVENTION

However, in the related technology described above, when a colliding body collides with the hood, the deformation mode of the ribs varies depending on, for example, whether or not the collision position is directly above an engagement portion of the ribs. There is accordingly room for improvement from the perspective of further enhancing energy absorption performance in a collision, while achieving a lightweight hood.

An object of an exemplary embodiment of the present invention is to obtain a vehicle hood structure capable of enhancing energy absorption performance in a collision, while achieving a lightweight hood.

A vehicle hood structure according to a first aspect of the present invention includes a hood outer panel and a hood inner panel, wherein the hood inner panel is made from a resin, is disposed at a hood lower side of the hood outer panel, is joined to the hood outer panel, and comprises a general portion, plural ribs and a weakened portion, wherein: the general portion has a general face that faces the hood outer panel, the plural ribs project out from the general portion toward the hood outer panel side and extend along the general face, and are set at intervals in either a hood width direction or a hood front-rear direction, and the weakened portion is formed at the ribs and extends along the extension direction of the ribs.

According to the above configuration, the hood inner panel is made from resin, and is therefore more lightweight than if it were made from metal. However, when a colliding body collides with the hood, the hood is more readily displaced, and a collision reaction force decreases, commensurate with this lighter weight. By way of a countermeasure thereto, in the present aspect, the plural ribs projecting out from the general portion of the hood inner panel toward the hood outer panel side extend along the general face of the hood inner panel, and the ribs are set at intervals in either the hood width direction or the hood front-rear direction. The bending rigidity of the hood inner panel is accordingly raised, such that when a colliding body collides with the hood, collision reaction force is raised from when the hood inner panel begins to deform in the acting direction of collision load. Collision energy is accordingly effectively absorbed from when the colliding body presses the hood until the hood impinges on a component at the lower side of the hood.

In the present aspect, the weakened portion is formed at the ribs, and the weakened portion extends along an extension direction of the ribs. Accordingly, when a collision load of a specific value or greater acts on the rib due to the colliding body colliding with the hood and the hood impinging on the component at the lower side thereof, the rib undergoes crushing deformation originating at the weakened portion, unaffected by the collision position of the colliding body (or substantially unaffected by the collision position). Collision energy is accordingly stably absorbed even after the hood has impinged on the component at the lower side thereof.

A second aspect is the vehicle hood structure of the first aspect, wherein plural of the weakened portions are set at an interval along a projection direction of the ribs.

According to the above configuration, when collision load acts on the rib, the plural weakened portions set at an interval along the projection direction of the ribs act as deformation origins at different timings, such that crushing deformation of the rib progresses in stages. With such a configuration, collision reaction force is controlled as the rib is crushed.

A third aspect is the vehicle hood structure of the second aspect, wherein plural of the weakened portions are also set at an interval along the extension direction of the ribs, and intervals between the plural weakened portions forming rows along the extension direction of the ribs are set such that an interval between upper side weakened portions set relatively on a hood upper side is shorter than an interval between lower side weakened portions set relatively on a hood lower side.

According to the above configuration, connecting portions between the upper side weakened portions are shorter in width than connecting portions between the lower side weakened portions, such that when collision load acts on the rib from the upper side, the rib first undergoes crushing deformation originating at the upper side weakened portions, and then undergoes crushing deformation originating at the lower side weakened portions. Collision reaction force can accordingly be more stably controlled during crushing deformation of the rib.

A fourth aspect is the vehicle hood structure of either the second aspect or the third aspect, wherein the ribs extend along the hood front-rear direction.

According to the above configuration, when a colliding body collides from an oblique front upper side of the hood, load in a direction to compress the ribs can be received more efficiently than in a configuration in which the ribs extend along the hood width direction. This thereby enables more stable crushing of the ribs, originating sequentially at the weakened portions forming rows along the projection direction of the ribs.

A fifth aspect is the vehicle hood structure of any one of the first aspect to the fourth aspect, wherein a projection direction leading end portion of the ribs is formed with a curved face forming a semicircular protrusion having a diameter of a plate thickness of the ribs.

According to the above configuration, collision load can be concentrated on the leading end portion of the rib, thereby enabling effective crushing of the rib.

A sixth aspect is the vehicle hood structure of any one of the first aspect to the fifth aspect, wherein: the hood inner panel is made from fiber reinforced plastic; and reinforcing fibers in the general portion are arrayed randomly along the general face, and reinforcing fibers in the ribs are arrayed along the projection direction of the ribs.

According to the above configuration, the general portion does not compress readily with respect to collision load in a compression direction, whereas the rib does compress readily with respect to collision load in the compression direction. This thereby enables more effective crushing of the rib when collision load is input to the rib.

As described above, a vehicle hood structure according to an exemplary embodiment of the present invention exhibits the excellent advantageous effect of enhancing energy absorption performance in a collision while securing a lightweight hood.

BRIEF DESCRIPTION OF DRAWINGS

FIG. 7 is a graph illustrating G-S characteristics of a hood applied with a vehicle hood structure according to the first exemplary embodiment, and G-S characteristics of hoods applied with comparative structures.

FIG. 11 is a perspective view illustrating a hood inner panel of a hood applied with a vehicle hood structure according to a third exemplary embodiment of the present invention.

DETAILED DESCRIPTION OF PREFERRED EMBODIMENTS

First Exemplary Embodiment

Figure 1:
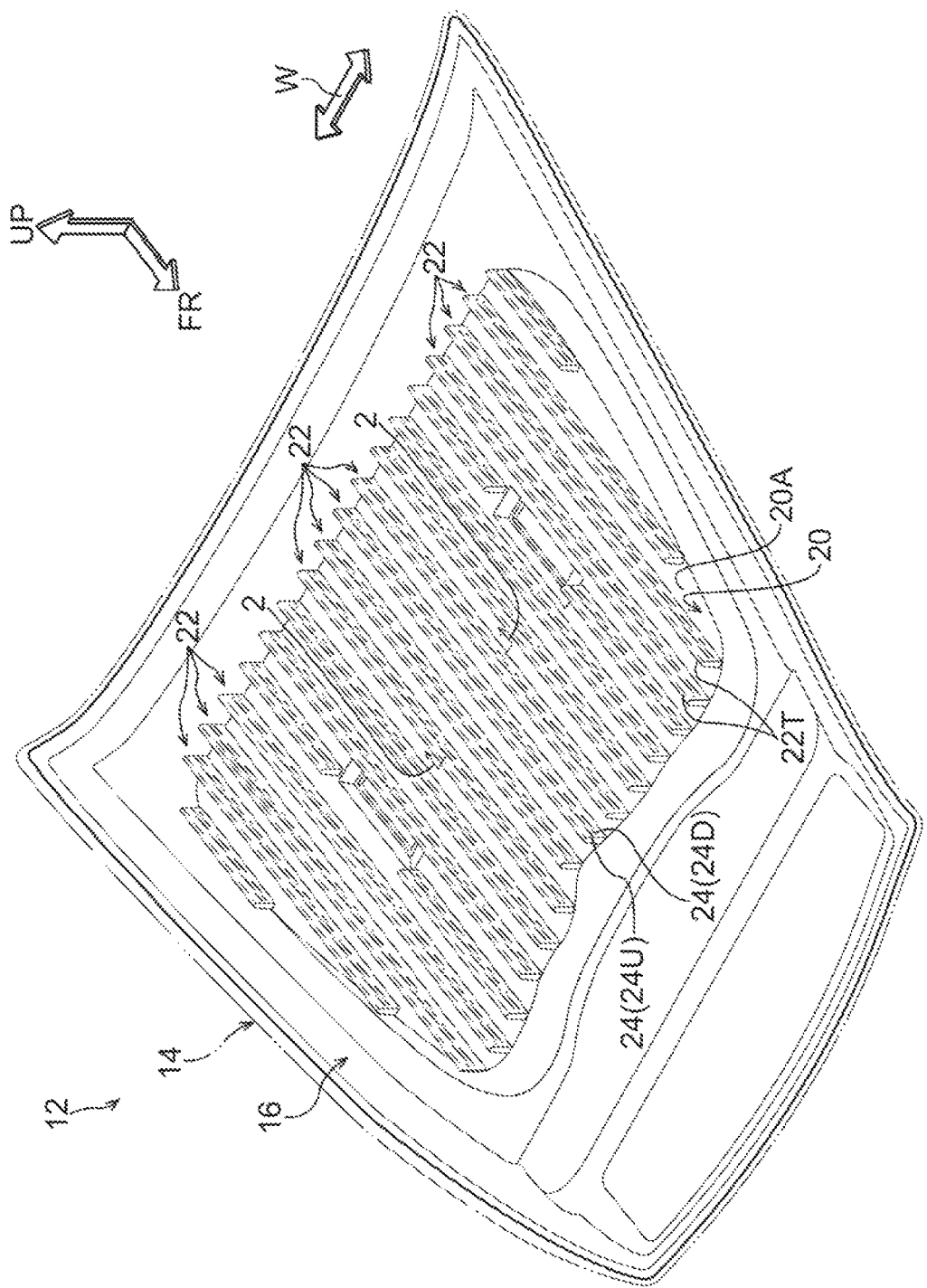
FIG. 1 is a perspective view illustrating a hood inner panel of a hood applied with a vehicle hood structure according to a first exemplary embodiment of the present invention.

Explanation follows regarding a vehicle hood structure according to a first exemplary embodiment of the present invention, with reference to FIG. 1 to FIG. 9. In the drawings, the arrow FR indicates the vehicle front side, the arrow UP indicates the vehicle upper side, and the arrow W indicates the vehicle width direction, as appropriate.

FIG. 1 is a perspective view illustrating a hood inner panel 16 configuring an inner panel of a hood 12 applied with the vehicle hood structure according to the present exemplary embodiment, in which the external profile of a hood outer panel 14 configuring an outer panel of the hood 12 is illustrated by a double-dotted intermittent line. As illustrated in schematic side view in FIG. 5A, the hood 12 configures an opening and closing body that covers a power unit chamber 10A of a vehicle front section 10 of a car (vehicle) from the upper side, such that the power unit chamber 10A can be opened and closed. A rigid component 18, such as a power unit, is installed inside the power unit chamber 10A. The power unit chamber 10A is also referred to as an engine compartment when the power unit is an engine. Hinges (not illustrated in the drawings) are installed on both sides of a hood front-rear direction rear end portion of the hood 12, such that the hood 12 is capable of rotational movement at the hinges about an axis along the hood width direction.

The hood outer panel 14 illustrated by the double-dotted intermittent line in FIG. 1 is made from metal (for example, an aluminum alloy) in the present exemplary embodiment, and extends substantially along the vehicle front-rear direction in a closed state of the hood 12. The hood outer panel 14 is configured in a substantially rectangular plate shape in plan view of the hood, and is slightly curved so as to bulge toward the hood upper side as viewed from the side of the hood. The hood inner panel 16 is made from fiber reinforced plastic (FRP) (for example, carbon fiber reinforced plastic (CFRP)), is disposed at a hood lower side of the hood outer panel 14, and is formed with an external profile substantially the same as that of the hood outer panel 14.

The fiber reinforced plastic material configuring the hood inner panel 16 is a composite material formed by setting fibers (reinforcing fibers) in resin. Fiber reinforced plastic materials are more lightweight than metal materials, and have high specific rigidity and high specific strength.

Despite high rigidity and low strength being the physical properties demanded from the perspective of energy absorption performance in a collision (so as to bear collision load over a long time, gaining stroke), fiber reinforced plastic materials may be said to have physical properties of low rigidity and high strength.

Figure 2:
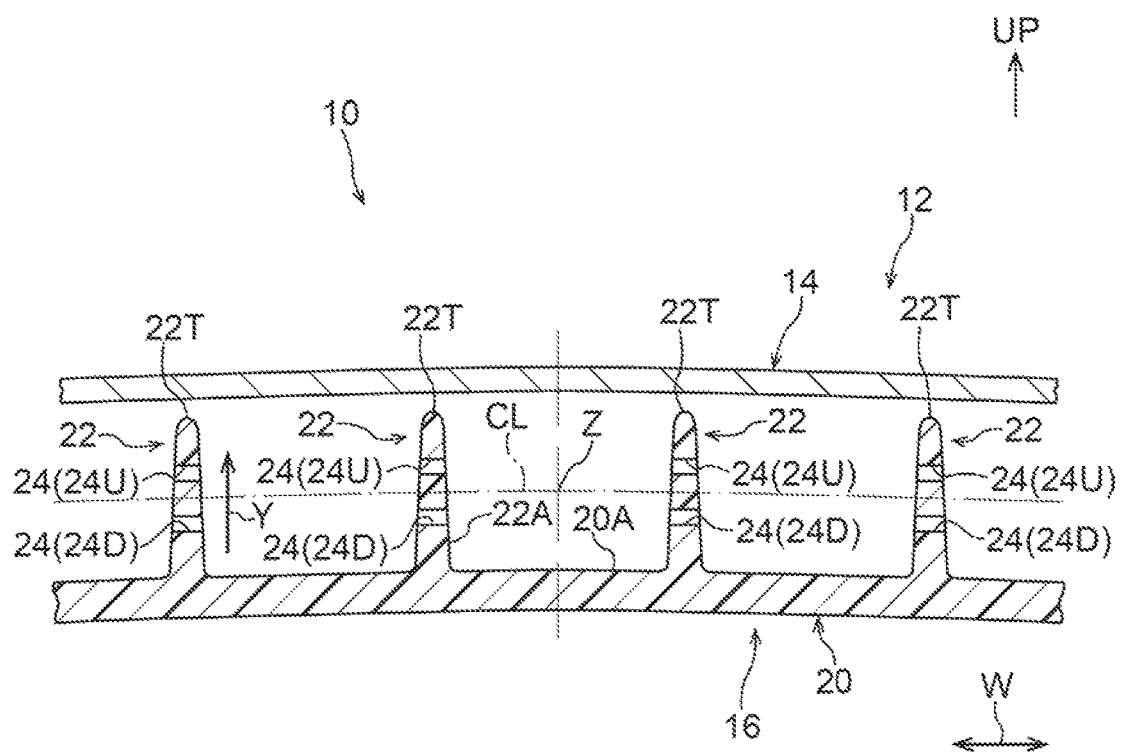
FIG. 2 is an enlarged cross-section corresponding to a cross-section taken along line 2-2 in FIG. 1.

An outer peripheral edge portion of the hood inner panel 16 and an outer peripheral edge portion of the hood outer panel 14 are joined together by hemming. The hood outer panel 14 and the hood inner panel 16 accordingly form a closed cross-section structure. FIG. 2 is an enlarged cross-section corresponding to a cross-section taken along line 2-2 in FIG. 1. As illustrated in FIG. 2, a gap is formed in the hood up-down direction between the hood outer panel 14 and the hood inner panel 16. In FIG. 2, the centroid of the cross-section of the hood 12 in FIG. 2 is labeled Z, and a center line passing through the centroid Z to indicate the central position in the hood up-down direction is labelled CL.

The hood inner panel 16 includes a general portion 20 wherein a general face 20A that faces the hood outer panel 14 is a hood upper side face. As illustrated in FIG. 1 and FIG. 2, the hood inner panel 16 is formed with plural ribs 22 that project out from the general portion 20 toward the hood outer panel 14 side, and extend along the general face 20A in the hood front-rear direction. The plural ribs 22 are set side-by-side at intervals across the hood width direction.

As illustrated in FIG. 2, a plate thickness of the ribs 22 is, for example, set thinner than the plate thickness of the general portion 20. Projection direction leading end portions 22T of the ribs 22 are formed with curved faces forming semicircular protrusions having a diameter of the plate thickness of the ribs 22. Bent portions formed between side faces 22A of the ribs 22 and the general face 20A are preferably set with a very tight radius of curvature.

Figure 3:
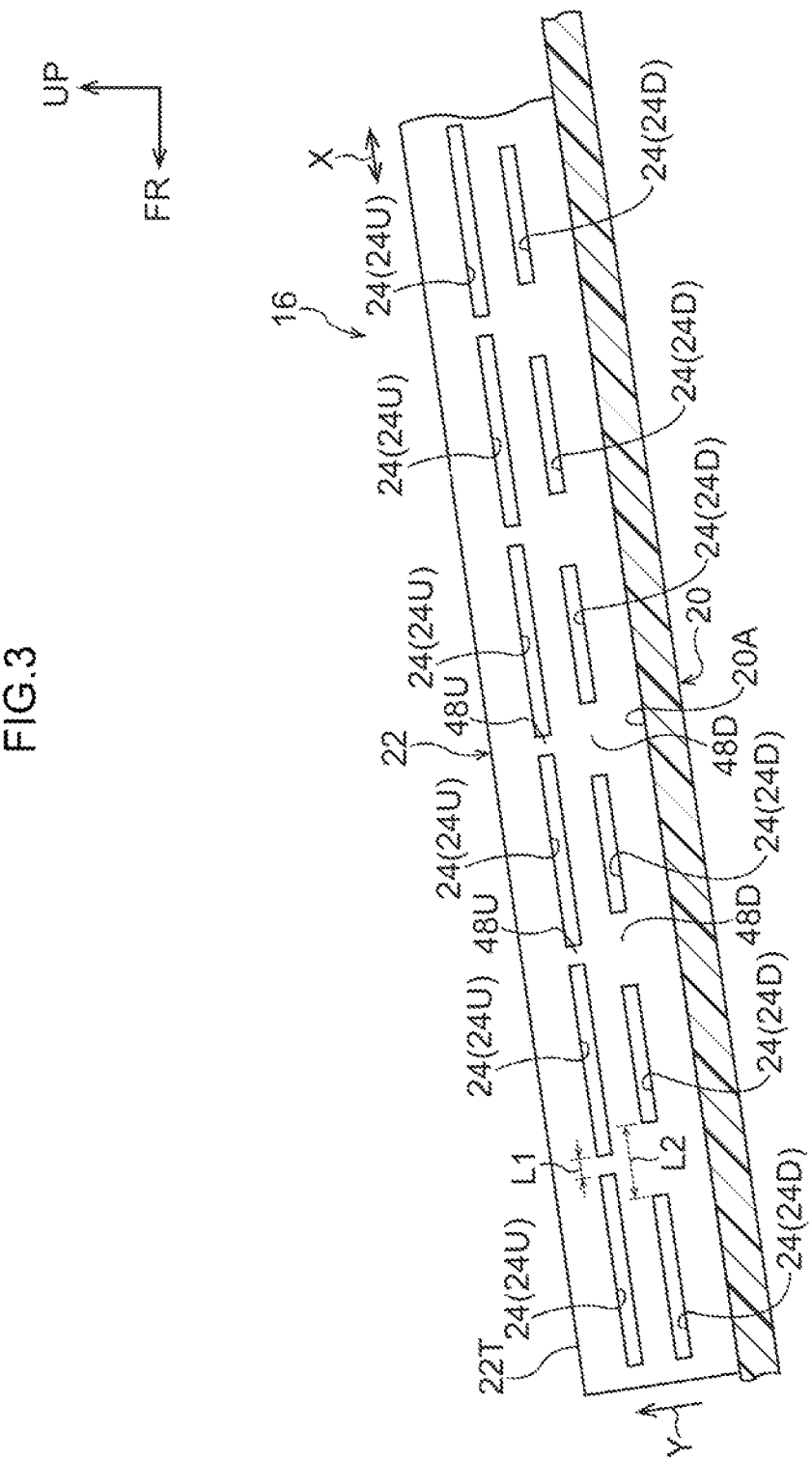
FIG. 3 is a side cross-section illustrating a portion of the hood inner panel in FIG. 1.

FIG. 3 is a side cross-section of a portion of the hood inner panel 16 (a cross-section in a state viewed from the side of the hood). As illustrated in FIG. 3, elongated holes 24, serving as slit shaped weakened portions extending along the extension direction of the ribs 22 (arrow X direction) (in other words, with length direction in the extension direction of the ribs 22 (arrow X direction)), are formed penetrating the ribs 22. Plural of the elongated holes 24 are set across the entire extension direction of the ribs 22 (arrow X direction). More specifically, plural of the elongated holes 24 (two in the present exemplary embodiment) are set at an interval in a projection direction of the ribs 22 (arrow Y direction), and plural of the elongated holes 24 are set at intervals in the extension direction of the ribs 22 (arrow X direction).

The intervals between the plural elongated holes 24 that form rows along the extension direction of the ribs 22 (arrow X direction) are set such that an interval L1 between upper side elongated holes 24U, serving as upper side weakened portions set relatively on the hood upper side, is shorter than an interval L2 between lower side elongated holes 24D, serving as lower side weakened portions set relatively on the hood lower side. The extension direction length (opening width) of each of the upper side elongated holes 24U is set sufficiently longer than the interval L1 between the upper side elongated holes 24U, and the extension direction length (opening width) of each of the lower side elongated holes 24D is likewise set sufficiently longer than the interval L2 between the lower side elongated holes 24D. Note that in the present exemplary embodiment, as an example, the upper side elongated holes 24U are disposed at uniform intervals in the extension direction of the ribs 22 (arrow X direction), and the lower side elongated holes 24D are likewise disposed at uniform intervals in the extension direction of the ribs 22 (arrow X direction). In the present exemplary embodiment, the elongated holes 24 are formed by post-processing, after forming the ribs 22.

Figure 4:
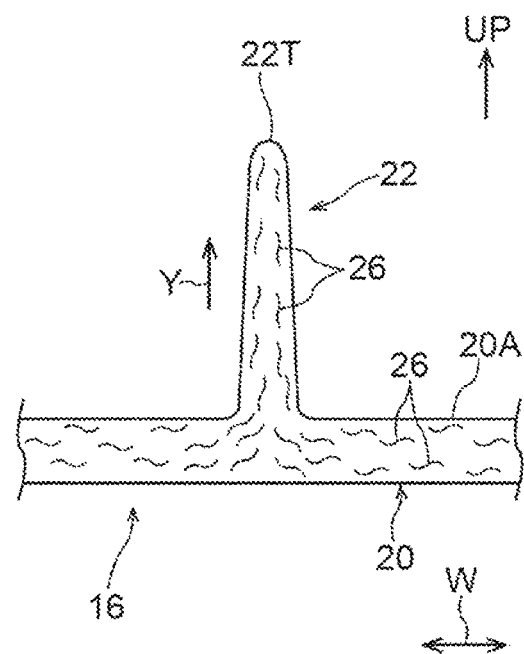
FIG. 4 is a vertical cross-section taken in face-on view of the hood, schematically illustrating array directions of reinforcing fibers in the hood inner panel in FIG. 1.

FIG. 4 is a schematic vertical cross-section taken in face-on view of the hood, illustrating array directions of reinforcing fibers 26 in the hood inner panel 16. As illustrated in FIG. 4, in the general portion 20 of the hood inner panel 16, the reinforcing fibers 26 are mainly arrayed randomly along the general face 20A. By contrast, in the ribs 22 of the hood inner panel 16, the reinforcing fibers 26 are mainly arrayed along the projection direction of the ribs 22 (arrow Y direction).

Operation and Advantageous Effects

Next, explanation follows regarding operation and advantageous effects of the above exemplary embodiment. FIG. 5, FIG. 6A, FIG. 6B and FIG. 6C that are referred to in the following explanation are schematic drawings illustrating a state in which a head impactor 30 (a colliding body simulating the head of a pedestrian) has collided with the hood 12 from an oblique front upper side of the hood (see the arrow P direction in FIG. 5).

Figure 5A:
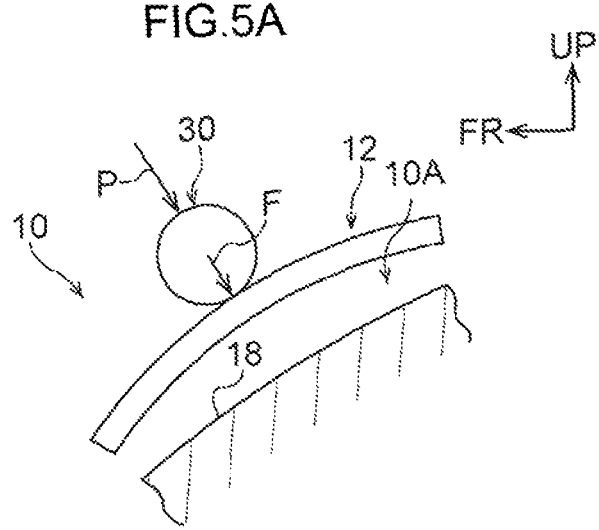
FIG. 5A is a side view schematically illustrating a state in which a colliding body starts pressing a hood when the colliding body has collided with the hood.
Figure 5B:
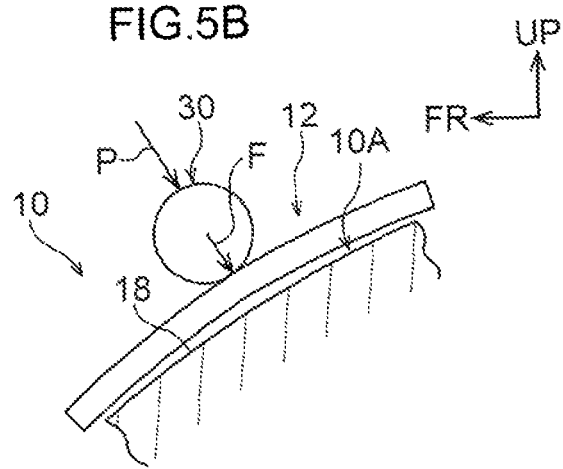
FIG. 5B is a side view schematically illustrating a state in which the hood has flexed while undergoing displacement when a colliding body has collided with the hood.
Figure 5C:
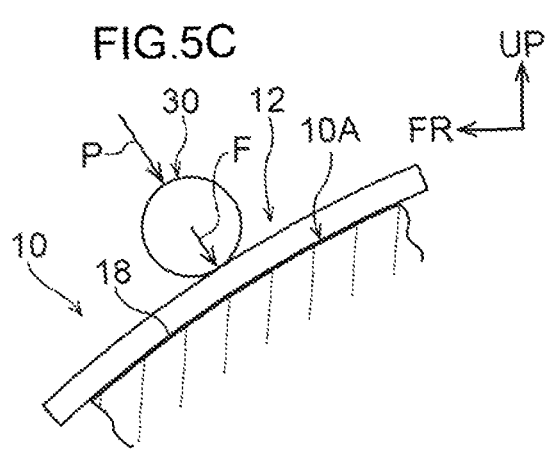
FIG. 5C is a side view schematically illustrating a state in which the hood has impinged on a rigid component of a power unit chamber when a colliding body has collided with the hood.
Figure 6A:
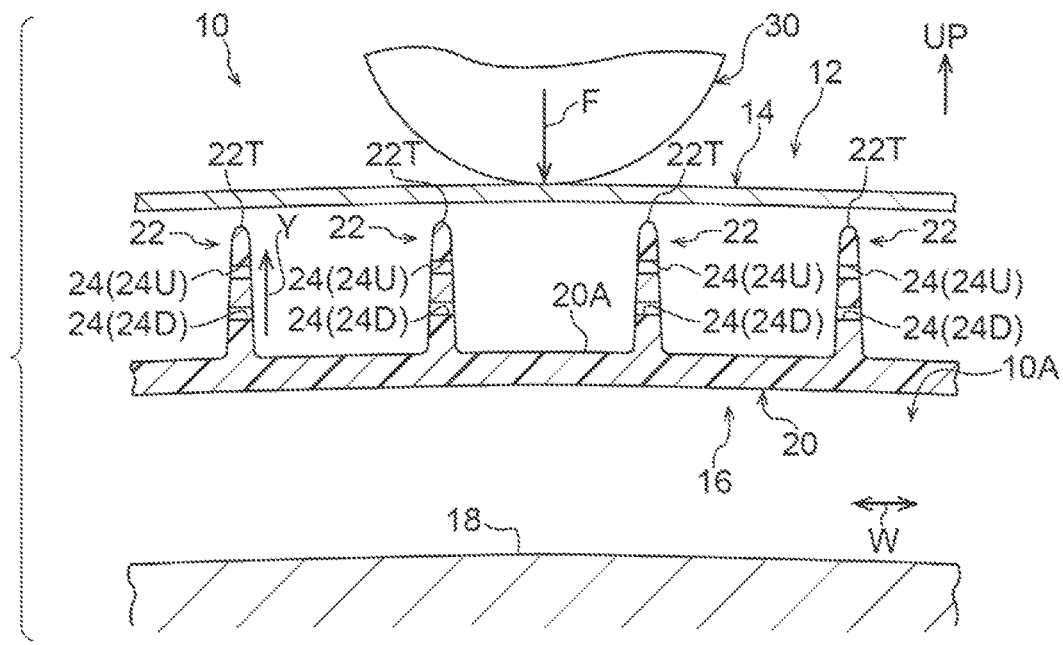
FIG. 6A is a face-on vertical cross-section schematically illustrating a state at a similar timing to that of FIG. 5A when a colliding body has collided with the hood.
Figure 6B:
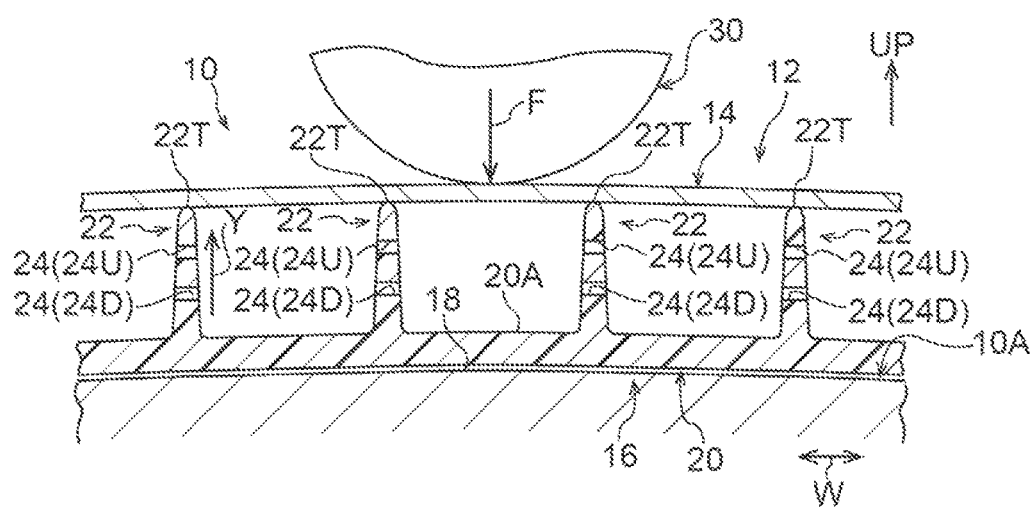
FIG. 6B is a vertical cross-section schematically illustrating a state at substantially the same timing as that of FIG. 5B when a colliding body has collided with the hood.
Figure 6C:
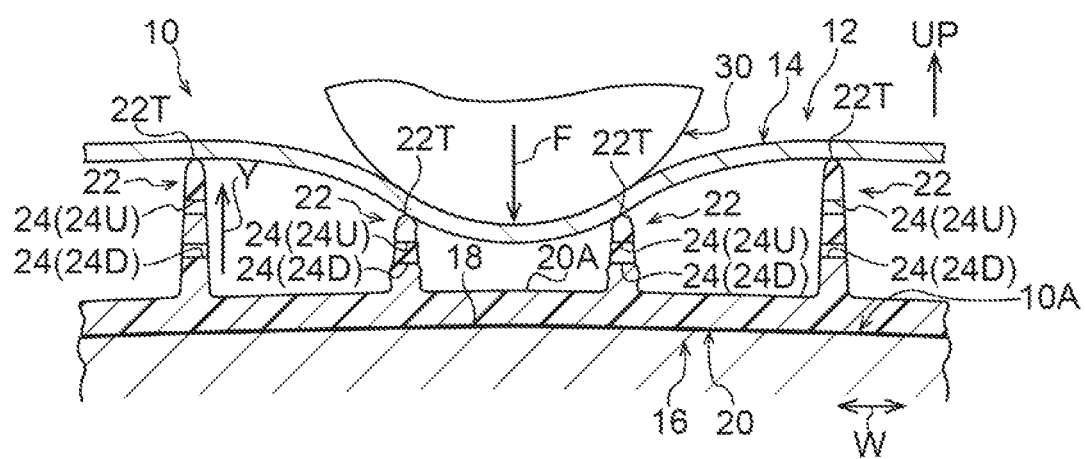
FIG. 6C is a vertical cross-section schematically illustrating a crushed state of a rib at a later timing than that of FIG. 5C when a colliding body has collided with the hood.

Specifically, FIG. 5 are schematic side views of the hood 12. FIG. 5A illustrates a state in which the head impactor 30 has started to press the hood 12, FIG. 5B illustrates a state in which the hood 12 has flexed while undergoing displacement (has deformed), and FIG. 5C illustrates a state in which the hood 12 has impinged on the rigid component 18 of the power unit chamber 10A. FIG. 6A, FIG. 6B and FIG. 6C are schematic vertical cross-sections taken in face-on view of the hood 12. FIG. 6A illustrates a state at a similar timing to that of FIG. 5A, FIG. 6B illustrates a state at substantially the same timing as that of FIG. 5B, and FIG. 6C illustrates a state in which the ribs 22 have been crushed, at a later timing than that of FIG. 5C. Note that various settings may be adopted for the spacing between the hood 12 and the rigid component 18 illustrated in FIG. 6A.

In the present exemplary embodiment, the hood inner panel 16 illustrated in FIG. 1 is made from fiber reinforced plastic, and is therefore more lightweight than if it were made of metal. However, when the head impactor 30 collides with the hood 12 as illustrated in FIG. 5, FIG. 6A, FIG. 6B and FIG. 6C, the hood 12 is more readily displaced from the position illustrated in FIG. 5A and FIG. 6A, and collision reaction force decreases, commensurate with this lighter weight.

By way of a countermeasure thereto, in the present exemplary embodiment, the plural ribs 22 projecting out from the general portion 20 of the hood inner panel 16 toward the hood outer panel 14 side illustrated in FIG. 1 extend along the general face 20A of the hood inner panel 16, and the ribs 22 are set at intervals across the hood width direction. The bending rigidity of the hood inner panel 16 is accordingly raised, such that when the head impactor 30 collides with the hood 12 as illustrated in FIG. 5, FIG. 6A, FIG. 6B and FIG. 6C, collision reaction force is raised from when the hood inner panel 16 that was at the position illustrated in FIG. 6A begins to deform in the acting direction of collision load F (in other words the vehicle lower side).

In particular, in the present exemplary embodiment, as illustrated in FIG. 1, the plural ribs 22 extend along the hood front-rear direction, thereby giving higher rigidity with respect to collision load attempting to flex the hood inner panel 16 toward the hood lower side as viewed from the side of the hood than a structure in which, for example, plural ribs extend along the hood width direction. Collision reaction force from when the hood inner panel 16 begins to deform is accordingly effectively increased.

The hood 12 illustrated in FIG. 5A and FIG. 6A accordingly absorbs collision energy effectively from when it is pressed by head impactor 30 and throughout the state illustrated in FIG. 5B and FIG. 6B, up until it impinges on the rigid component 18 of the power unit chamber 10A, as illustrated in FIG. 5C. Note that in vehicle structures with a wide spacing between the hood 12 and the rigid component 18 of the power unit chamber 10A, out of the total amount of collision energy absorbed during a collision, the proportion of collision energy absorbed by the time the hood 12 impinges on the rigid component 18 is relatively large, thus making increasing the rigidity of the hood inner panel 16 all the more important.

Supplementary explanation follows regarding increasing the rigidity, with comparison to a comparative structure. In the structure of the present exemplary embodiment set with the ribs 22 illustrated in FIG. 2, for example, mass (massive portions) can be set at a position separated from the center line CL passing through the centroid Z more efficiently than in a comparative structure in which a hood inner panel is configured in a corrugated plate shape. Namely, the structure of the present exemplary embodiment enables increased second moment of area in comparison to the comparative structure, achieving higher bending rigidity with respect to collision load than in the comparative structure.

In the present exemplary embodiment, the hood inner panel 16 is made from carbon fiber reinforced plastic, and as illustrated in FIG. 4, the reinforcing fibers 26 are mainly arrayed randomly along the general face 20A of the general portion 20, thereby imparting high tensile rigidity. Accordingly, when collision load attempts to bend the hood inner panel 16 toward the hood lower side, deformation of the hood inner panel 16 is effectively suppressed, thereby increasing collision reaction force, even when tensile load acts on the hood inner panel 16.

In the present exemplary embodiment, as illustrated in FIG. 1 to FIG. 3, the elongated holes 24 are formed penetrating the ribs 22. The elongated holes 24 extend along the extension direction of the respective ribs 22 (the arrow X direction in FIG. 3). Accordingly, as illustrated in FIG. 5C, when a collision load of a specific value or greater acts on the ribs 22 (see FIG. 1) due to the head impactor 30 colliding with the hood 12 and the hood 12 impinging on the rigid component 18 at the lower side thereof, the ribs 22 undergo crushing deformation originating at the elongated holes 24 as illustrated in FIG. 6C, regardless of the collision position of the head impactor 30 (unaffected by, or substantially unaffected by, the collision position). The hood 12 accordingly absorbs collision energy stably, even after the hood 12 has impinged on the rigid component 18 at the lower side thereof. An uncrushed amount of the ribs 22 can moreover be reduced, thereby enabling a longer deformation stroke of the hood 12 toward the hood lower side than in a structure in which ribs do not undergo crushing deformation.

Supplementary explanation follows regarding crushing deformation, with comparison to a comparative structure. For example, in a comparative structure in which plural ribs are set on a resin hood inner panel, but the respective ribs are not set with weakened portions, although collision reaction force can be secured up until the hood impinges on the rigid component at the lower side thereof due to the increased rigidity of the hood inner panel, after the hood has impinged on the rigid component the hood inner panel does not crush as readily as in a structure not provided with ribs. In particular, in cases in which the hood inner panel of the comparative structure is configured from a fiber reinforced plastic material, the fiber reinforced plastic material has high strength, thus exacerbating the difficulty of crushing the hood inner panel. The comparative structure accordingly leaves room for improvement when it comes to securing collision energy absorption and stroke after the hood has impinged on the rigid component.

In contrast, in the present exemplary embodiment, the ribs 22 are set with the elongated holes 24 extending along the extension direction of the ribs 22, such that in comparison to the comparative structure, deformation stroke can be gained after the hood 12 has impinged on the rigid component 18, and the amount of collision energy absorbed by the time the hood 12 has been completely crushed, referred to as bottoming out, can be increased. This thereby enables what is referred to as bottoming out load, arising when the hood 12 has been completely crushed and bottoms out, to be suppressed.

Next, explanation follows regarding energy absorption performance during a collision, with reference to the graph in FIG. 7. FIG. 7 is a graph respectively illustrating G-S characteristics, namely relationships between deceleration G in the strike direction of the head impactor, and the stroke S, in a hood applied with the vehicle hood structure according to the present exemplary embodiment, and in hoods applied with comparative structures.

The solid line in FIG. 7 illustrates G-S characteristics for the hood applied with the vehicle hood structure according to the present exemplary embodiment, the dotted line in FIG. 7 illustrates G-S characteristics for a hood applied with a vehicle hood structure applied with a first comparative structure, and the double-dotted intermittent line in FIG. 7 illustrates G-S characteristics for a hood applied with a second comparative structure. The first comparative structure is a structure in which a hood inner panel is made from fiber reinforced plastic and is formed with a corrugated profile in place of the ribs of the present exemplary embodiment. The second comparative structure is a structure in which a hood inner panel is made from an aluminum alloy, and is formed with a corrugated profile similarly to the first comparative structure.

In FIG. 7, point A corresponds to the timing illustrated in FIG. 5A, and the stroke B corresponds to the stroke at a timing at and around the state illustrated in FIG. 5B in the present exemplary embodiment (namely during flexing deformation of the hood 12). Moreover, in FIG. 7, the stroke C corresponds to the stroke at a timing from the state illustrated in FIG. 5C to roughly the state illustrated in FIG. 6C in the present exemplary embodiment (namely, during crushing deformation of the ribs 22), and the stroke D corresponds to the stroke at a timing from immediately after the roughly the state illustrated in FIG. 6C until the head impactor 30 rebounds in the present exemplary embodiment.

As illustrated in FIG. 7, the present exemplary embodiment (solid line) exhibits greater deceleration G than the first comparative structure (dotted line) and the second comparative structure (double-dotted intermittent line) in the stroke B range. This is observed since the bending rigidity of the hood inner panel 16 is increased by providing the ribs 22 in the present exemplary embodiment.

In the stroke C range in FIG. 7, the present exemplary embodiment (solid line) maintains the deceleration G, without a sharp rise as seen in the first comparative structure (dotted line). This is observed since the ribs 22 undergo effective crushing due to forming the ribs 22 with the elongated holes 24 extending along the extension direction of the ribs 22 in the present exemplary embodiment. Note that in the second comparative structure (double-dotted intermittent line), the hood inner panel is configured from an aluminum alloy with physical properties of high rigidity and low strength, with deformation of a corrugated plate portion thereby suppressing a sharp rise in the deceleration G.

Only the line of the second comparative structure (double-dotted intermittent line) that is made from an aluminum alloy, and the line of the present exemplary embodiment (solid line), are present in the stroke D range in FIG. 7. In other words, it can be seen that the present exemplary embodiment (solid line) has a longer stroke than the first comparative structure (dotted line), and secures a stroke equivalent to that of the second comparative structure (double-dotted intermittent line) that is made from an aluminum alloy.

Moreover, in the stroke D range in FIG. 7, the present exemplary embodiment (solid line) exhibits greater suppression of what is referred to as bottoming out deceleration, occurring when the hood is completely crushed and bottoms out, than the second comparative structure (double-dotted intermittent line). This is observed since the amount of collision energy that has been absorbed by the time the hood is completely crushed and bottoms out is greater in the present exemplary embodiment (solid line) than in the second comparative structure (double-dotted intermittent line).

Next, more specific explanation follows regarding crushing deformation of the ribs 22 (see FIG. 1). In the present exemplary embodiment, as illustrated in FIG. 3, plural of the elongated holes 24 are set at an interval in the projection direction of the ribs 22 (arrow Y direction). Accordingly, when collision load acts on the ribs 22, the plural elongated holes 24 set at an interval in the projection direction of the ribs 22 (arrow Y direction) act as deformation origins at different timings to each other, and crushing deformation of the ribs 22 progresses in stages. Collision reaction force is thus controlled as the ribs 22 are crushed.

In the present exemplary embodiment, plural of the elongated holes 24 are also set at intervals in the extension direction of the ribs 22 (arrow X direction). In the intervals between the plural elongated holes 24 forming rows along the extension direction of the ribs 22 (arrow X direction), the interval L1 between the upper side elongated holes 24U set relatively toward the hood upper side is set shorter than the interval L2 between the lower side elongated holes 24D set relatively toward the hood lower side. Accordingly, connecting portions 48U between the upper side elongated holes 24U have a shorter width than connecting portions 48D between the lower side elongated holes 24D. When collision load from the upper side acts on the ribs 22, the ribs 22 therefore first undergo crushing deformation originating at the upper side elongated holes 24U, after which the ribs 22 undergo crushing deformation originating at the lower side elongated holes 24D. Collision reaction force is accordingly even more stably controlled during crushing deformation of the ribs 22.

Supplementary explanation follows regarding the stage-wise crushing deformation of the ribs 22, with reference to FIG. 8 and FIG. 9.

Figure 8A:
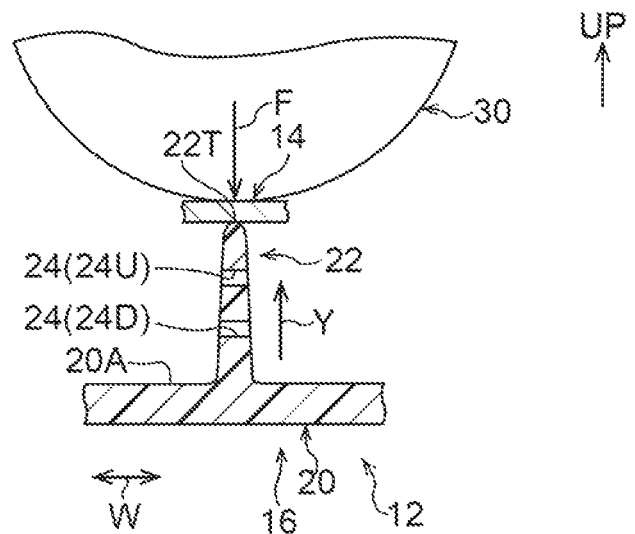
FIG. 8A is a schematic vertical cross-section illustrating a state in which input of collision load to a rib has started when a colliding body has collided with a hood.
Figure 8B:
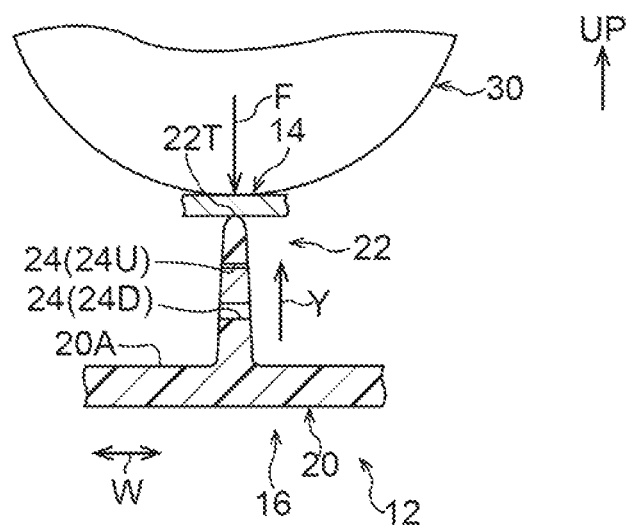
FIG. 8B is a schematic vertical cross-section illustrating a crushed state of an upper side elongated hole when a colliding body has collided with the hood.
Figure 8C:
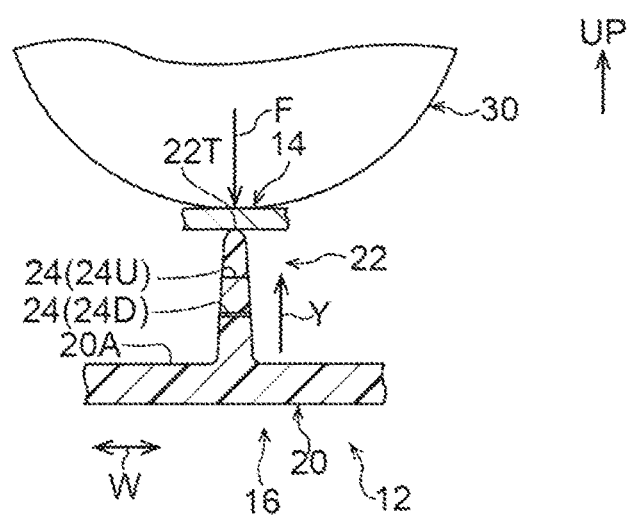
FIG. 8C is a schematic vertical cross-section illustrating a crushed state of a lower side elongated hole when a colliding body has collided with the hood.

FIG. 8 are schematic vertical cross-sections to explain deformation states of the ribs 22 when the head impactor 30 collides with the hood 12. FIG. 8A illustrates a state at the start of input of the collision load F to a rib 22, FIG. 8B illustrates a crushed state of the upper side elongated hole 24U, and FIG. 8C illustrates a crushed state of the lower side elongated hole 24D.

FIG. 9 are schematic graphs to explain G-S characteristics following input of the collision load F to the hood 12 provided with the ribs 22. FIG. 9A illustrates from the state in FIG. 8A up until an intermediate state in the first half of crushing deformation of the upper side elongated holes 24U, and FIG. 9B illustrates from the state in FIG. 8A until the state in FIG. 8B. FIG. 9C illustrates from the state in FIG. 8A up until an intermediate state of crushing deformation of the lower side elongated holes 24D (a state in which the lower side elongated holes 24D have been crushed approximately halfway), and FIG. 9D illustrates from the state in FIG. 8A up until a completed state of crushing deformation of the lower side elongated holes 24D (a state slightly later than that in FIG. 8C) with a solid line.

Figure 9A:
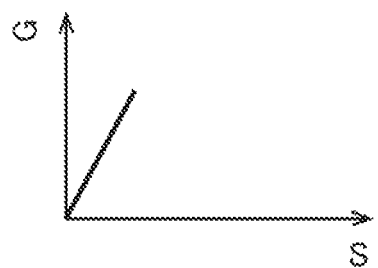
FIG. 9A is a graph schematically illustrating G-S characteristics after input of collision load to a rib, from the state illustrated in FIG. 8A up until an intermediate state in the first half of crushing deformation of upper side elongated holes.
Figure 9B:
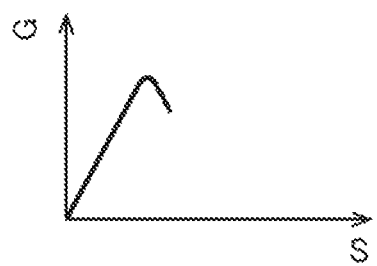
FIG. 9B is a graph schematically illustrating G-S characteristics after input of collision load to a rib, from the state illustrated in FIG. 8A up until the state illustrated in FIG. 8B.

First, as illustrated in FIG. 8A, when the collision load F is input to the ribs 22, the general portion 20 flexes slightly, after which the upper side elongated holes 24U are gradually crushed, such that the head impactor 30 undergoes displacement toward the hood lower side. Up until the first half of crushing deformation of the upper side elongated holes 24U, stroke S can be gained while increasing the deceleration G, as illustrated in FIG. 9A. During the latter half of crushing deformation of the upper side elongated holes 24U, as illustrated in FIG. 8B, stroke S can be gained while reducing the deceleration G, as illustrated in FIG. 9B.

Figure 9C:
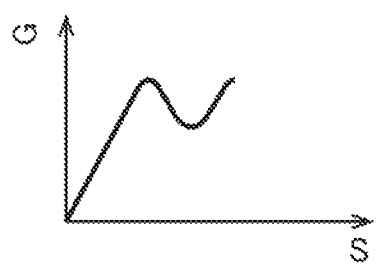
FIG. 9C is a graph schematically illustrating G-S characteristics after input of collision load to a rib, from the state illustrated in FIG. 8A up until an intermediate state of crushing deformation of lower side elongated holes.

Next, when the upper side elongated holes 24U have been completely crushed from the state illustrated in FIG. 8B, the lower side elongated holes 24D are crushed, as illustrated in FIG. 8C. Up until the first half of crushing deformation of the lower side elongated holes 24D, stroke S can be gained while once again increasing the deceleration G as illustrated in FIG. 9C, and during the latter half of crushing deformation of the lower side elongated holes 24D, stroke S can be gained while reducing the deceleration G, as illustrated in FIG. 9D.

Figure 9D:
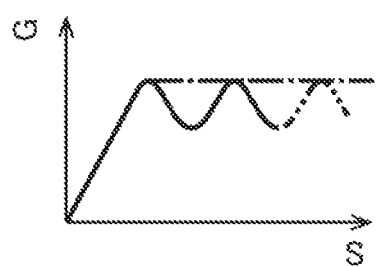
FIG. 9D is a graph illustrating G-S characteristics after input of collision load to a rib, from the state illustrated in FIG. 8A up until a completed state of crushing deformation of lower side elongated holes, with a solid line.

The single-dotted intermittent line in FIG. 9D illustrates an ideal waveform (a waveform in which the deceleration G approximates to a constant square wave across the entire stroke range). It can be seen that the waveform of the present exemplary embodiment, illustrated by the solid line approaches the ideal waveform illustrated by the single-dotted intermittent line. Note that in FIG. 9D, the double-dotted intermittent line running on from the solid line is a waveform in which an elongated hole third from the top is crushed when employing a structure set with three elongated holes (24) that extend along the extension direction of ribs (22) at intervals along the projection direction of the ribs (22) (another exemplary embodiment of the present invention), so as to approach the ideal waveform illustrated by the single-dotted intermittent line. The G-S characteristics can accordingly be made to approach desired characteristics by setting the elongated holes (24) at intervals in the projection direction of the ribs (22).

In the present exemplary embodiment, as illustrated in FIG. 1, the ribs 22 extend along the hood front-rear direction, such that when the head impactor 30 (see FIG. 5A) collides from the oblique front upper side of the hood, load in a direction to compress the ribs 22 can be received more efficiently than in a configuration in which the ribs 22 extend along the hood width direction. The ribs 22 can accordingly undergo more stable crushing, originating sequentially at the elongated holes 24 forming rows along the projection direction of the ribs 22 illustrated in FIG. 3 (arrow Y direction).

In the present exemplary embodiment, as illustrated in FIG. 2, etc., the leading end portions 22T in the projection direction of the ribs 22 (arrow Y direction) are formed with curved faces forming semicircular protrusions having a diameter of the plate thickness of the ribs 22. Accordingly, as illustrated in FIG. 8, the surface area of the leading end portions 22T of the ribs 22 that contact the head impactor 30 through the hood outer panel 14 during a collision can be kept to a minimum, thereby enabling the input of the collision load F to the leading end portions 22T of the ribs 22 to be increased per unit surface area. This thereby enables the collision load F to be concentrated on the leading end portions 22T of the ribs 22, enabling effective crushing of the ribs 22.

In the present exemplary embodiment, as illustrated in FIG. 4, in the hood inner panel 16, the reinforcing fibers 26 are mainly arrayed randomly along the general face 20A in the general portion 20, whereas the reinforcing fibers 26 are mainly arrayed along the projection direction of the ribs 22 (arrow Y direction) in the ribs 22. Accordingly, the general portion 20 is not readily compressed with respect to collision load in a compression direction, whereas the ribs 22 are readily compressed with respect to collision load in a compression direction. As illustrated in FIG. 6C, this thereby enables more effective crushing of the ribs 22 when the ribs 22 are input with the collision load F.

As described above, the vehicle hood structure of the present exemplary embodiment enables enhanced energy absorption performance in a collision, while securing a lightweight hood 12, illustrated in FIG. 1, etc.

Second Exemplary Embodiment

Figure 10:
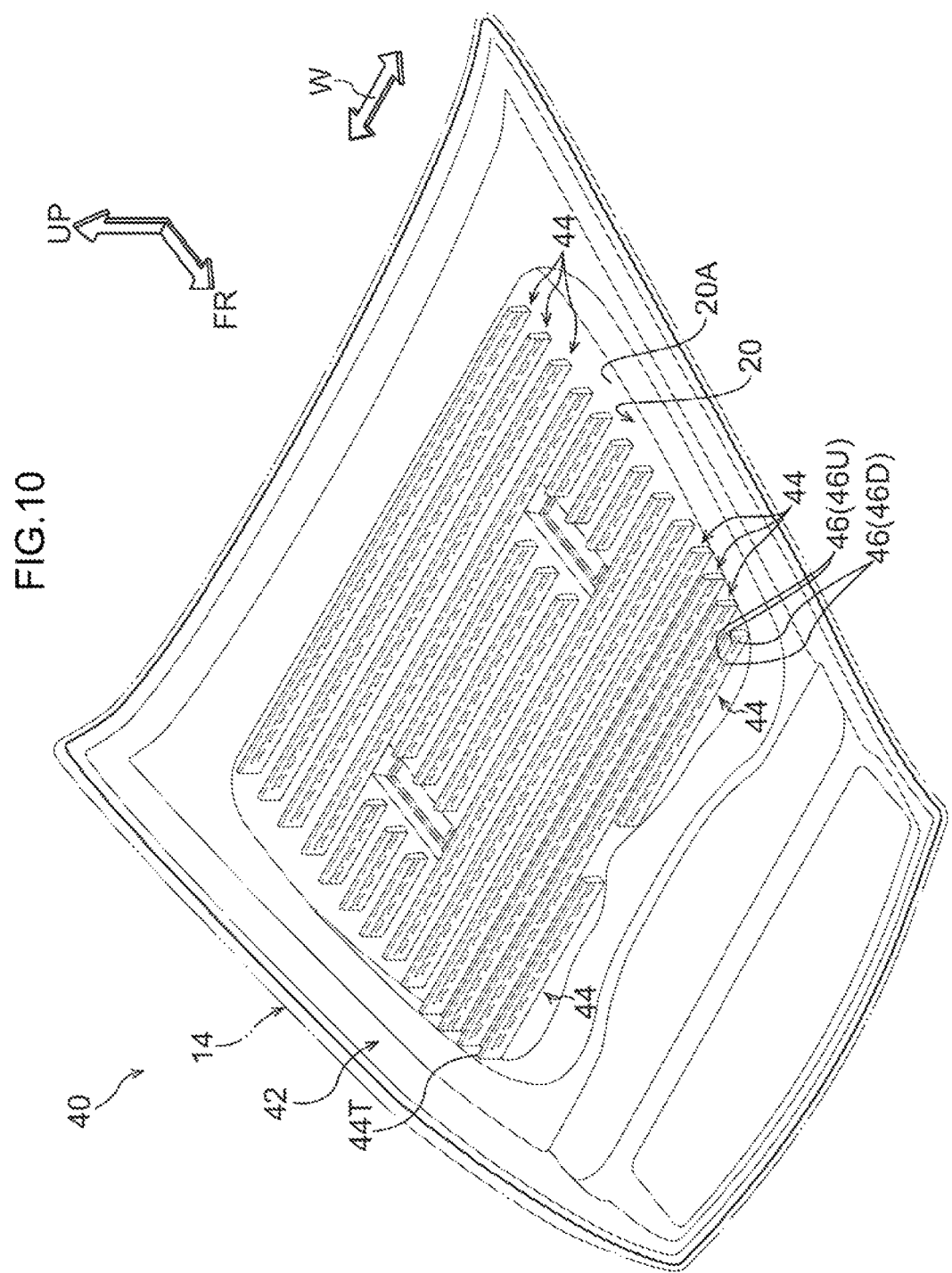
FIG. 10 is a perspective view illustrating a hood inner panel of a hood applied with a vehicle hood structure according to a second exemplary embodiment of the present invention.

Next, explanation follows regarding a vehicle hood structure according to a second exemplary embodiment of the present invention, with reference to FIG. 10. FIG. 10 is a perspective view illustrating a hood inner panel 42, configuring an inner panel of a hood 40 applied with the vehicle hood structure according to the present exemplary embodiment, in which the external profile of a hood outer panel 14 configuring an outer panel of the hood 40 is illustrated by a double-dotted intermittent line. As illustrated in FIG. 10, the hood inner panel 42 of the present exemplary embodiment differs from the hood inner panel 16 of the first exemplary embodiment (see FIG. 1) in that it includes ribs 44 extending along the hood width direction in place of the ribs 22 extending along the hood front-rear direction (see FIG. 1). Other configurations are substantially the same as those of the first exemplary embodiment. Accordingly, configuration elements that are substantially the same as in the first exemplary embodiment are allocated the same reference numerals, and explanation thereof is omitted as appropriate.

The hood inner panel 42 is configured by a fiber reinforced plastic panel member that is disposed at the hood lower side of the hood outer panel 14 and joined to the hood outer panel 14, similarly to the hood inner panel 16 of the first exemplary embodiment (see FIG. 1, etc.). The hood inner panel 42 also includes a general portion 20 that is substantially the same as that of the first exemplary embodiment. Namely, the general portion 20 wherein a general face 20A that faces the hood outer panel 14 is a hood upper side face.

The plural ribs 44 formed to the hood inner panel 42 project out from the general portion 20 toward the hood outer panel 14 side, extend in the hood width direction along the general face 20A, and are set at intervals in the hood front-rear direction. Similarly to in the first exemplary embodiment, projection direction leading end portions 44T of the ribs 44 are formed as curved faces forming semicircular protrusions having a diameter of the plate thickness of the ribs 44.

Elongated holes 46, serving as weakened portions and extending along the extension direction of the ribs 44, are formed penetrating the ribs 44. The elongated holes 46 are set similarly to the elongated holes 24 of the first exemplary embodiment (see FIG. 1, etc.). Namely, plural of the elongated holes 46 are set at an interval in the projection direction of the ribs 44, and plural of the elongated holes 46 are also set at intervals along the extension direction of the ribs 44. The intervals between the plural elongated holes 46 forming rows along the extension direction of the ribs 44 are set such that an interval between upper side elongated holes 46U, serving as upper side weakened portions set relatively on the hood upper side, is shorter than an interval between lower side elongated holes 46D, serving as lower side weakened portions set relatively on the hood lower side.

According to the above configuration, the bending rigidity of the hood inner panel 42 is raised by the ribs 44, such that when a colliding body such as a head impactor etc. collides with the hood 40, collision reaction force is raised up until the hood 40 impinges on a rigid component at the lower side thereof. Moreover, after the colliding body has collided with the hood 40 and the hood 40 has impinged on the rigid component at the lower side thereof, the ribs 44 undergo stable crushing deformation originating at the elongated holes 46, unaffected (or substantially unaffected) by the collision position of the colliding body. Accordingly, the vehicle hood structure of the present exemplary embodiment enables enhanced energy absorption performance in a collision, while securing a lightweight hood 40.

Third Exemplary Embodiment

Next, explanation follows regarding a vehicle hood structure according to a third exemplary embodiment of the present invention, with reference to FIG. 11. FIG. 11 is a perspective view illustrating a hood inner panel 52 configuring an inner panel of a hood 50 applied with the vehicle hood structure according to the present exemplary embodiment, in which the external profile of a hood outer panel 14 configuring an outer panel of the hood 50 is illustrated by a double-dotted intermittent line. As illustrated in FIG. 11, the hood inner panel 52 of the present exemplary embodiment differs from the hood inner panel 16 of the first exemplary embodiment (see FIG. 1) in that it includes ribs 54 extending along oblique directions with respect to the hood front-rear direction in place of the ribs 22 extending along the hood front-rear direction (see FIG. 1). Other configurations are substantially the same as those of the first exemplary embodiment. Accordingly, configuration elements that are substantially the same as in the first exemplary embodiment are allocated the same reference numerals, and explanation thereof is omitted as appropriate.

The hood inner panel 52 is configured by a fiber reinforced plastic panel member that is disposed at the hood lower side of the hood outer panel 14 and joined to the hood outer panel 14, similarly to the hood inner panel 16 of the first exemplary embodiment (see FIG. 1, etc.). The hood inner panel 52 also includes a general portion 20 that is substantially the same as that of the first exemplary embodiment. Namely, the general portion 20 wherein a general face 20A that faces the hood outer panel 14 is a hood upper side face.

The plural ribs 54 formed to the hood inner panel 52 project out from the general portion 20 toward the hood outer panel 14 side, extend along the general face 20A, and are set at intervals in the hood width direction. The extension directions of the plural ribs 54 are set in oblique directions such that a rear end of each rib 54 is positioned to the hood width direction outside of a front end of the respective rib 54. Each rib 54 is set at a location on the right side or a location on the left side in the hood width direction of the hood inner panel 52, without straddling a hood width direction central portion of the hood inner panel 52. Similarly to in the first exemplary embodiment, projection direction leading end portions 54T of the ribs 54 are formed as curved faces forming semicircular protrusions having a diameter of the plate thickness of the ribs 54.

Elongated holes 56, serving as weakened portions extending along the extension direction of the ribs 54, are formed penetrating the ribs 54. Note that the elongated holes 56 formed in the ribs 54 on the hood right side (on the left side in the drawing) are hidden from view in FIG. 11 and are therefore not illustrated; however, in the present exemplary embodiment, the ribs 54 and the elongated holes 56 are set with left-right symmetry about a hood width direction center line, not illustrated in the drawings, of the hood inner panel 52.

The elongated holes 56 are set similarly to the elongated holes 24 of the first exemplary embodiment (see FIG. 1, etc.). Namely, plural of the elongated holes 56 are set at an interval in the projection direction of the ribs 54, and plural of the elongated holes 56 are also set at intervals along the extension direction of the ribs 54. The intervals between the plural elongated holes 56 forming rows along the extension direction of the ribs 54 are set such that an interval between upper side elongated holes 56U, serving as upper side weakened portions set relatively on the hood upper side, is shorter than an interval between lower side elongated holes 56D, serving as lower side weakened portions set relatively on the hood lower side.

The vehicle hood structure of the present exemplary embodiment obtains substantially the same operation as the second exemplary embodiment described above, and therefore enables enhanced energy absorption performance in a collision, while securing a lightweight hood 50.

Supplementary Explanation of the Exemplary Embodiments

In the exemplary embodiments described above, the hood outer panel 14 is made from an aluminum alloy; however, a hood outer panel may be made from another metal, or may be made from a resin (encompassing fiber reinforced plastics).

In the exemplary embodiments described above, the hood inner panel 16, 42, 52 is made from fiber reinforced plastic; however, a hood inner panel may be formed from a resin that is not fiber reinforced. When the hood inner panel is made from fiber reinforced plastic, the array of the reinforcing fibers may be set as a different array to that of the reinforcing fibers 26 in the above exemplary embodiments (see FIG. 4).

FIG. 1, FIG. 10, and FIG. 11 illustrate examples of the numbers of ribs 22, 44, 54 and the intervals between the ribs 22, 44, 54; however, the number of ribs formed to the hood inner panel and the intervals between the ribs may be set as appropriate. As a modified example of the above exemplary embodiments, the ribs 22, 44, 54 may be inclined on one side of the rib. For example, inclining the ribs 44 illustrated in FIG. 10 toward the hood rear side has the advantage of facilitating crushing of the ribs (44) with respect to collision load from the oblique front upper side of the hood.

In the exemplary embodiments described above, the ribs 22, 44, 54 are formed with the elongated holes 24, 46, 56 that serve as weakened portions. However, the weakened portions formed at the ribs may be configured by other weakened portions, such as V-groove shaped notches extending along the extension direction of the ribs, or thinned portions formed with a shape other than a V-groove. Note that such notches and the like may, for example, be formed on one side face of each rib, or may be formed on both side faces.

As a modified example of the above exemplary embodiments, plural weakened portions need not be set at intervals in the projection direction of the ribs. Moreover, as a modified example of the above exemplary embodiments, plural weakened portions need not be set at intervals in the extension direction of the ribs.

As a modified example of the above exemplary embodiments, the projection direction leading end portions of the ribs need not be formed as curved faces forming semicircular protrusions, and may, for example, be formed with an isosceles triangle shaped profile coming to a point at an apex portion.

In the sixth aspect, the concept of "reinforcing fibers in the general portion are arrayed randomly along the general face" encompasses cases in which, strictly speaking, not all of the reinforcing fibers, but nearly all of the reinforcing fibers disposed in the general portion follow the general face and are disposed randomly (namely, cases in which the reinforcing fibers disposed in the general portion are mainly arrayed randomly along the general face), as well as cases in which all of the reinforcing fibers disposed in the general portion are disposed randomly along the general face. Moreover, in the sixth aspect, the concept of "reinforcing fibers in the ribs are arrayed along the projection direction of the ribs" encompasses cases in which, strictly speaking, not all of the reinforcing fibers, but nearly all of the reinforcing fibers disposed in the ribs are disposed along the projection direction of the rib (namely, cases in which the reinforcing fibers disposed in the ribs are mainly arrayed along the projection direction of the rib), as well as cases in which all of the reinforcing fibers disposed in the ribs are disposed along the projection direction of the rib.

The exemplary embodiments and plural modified examples described above may be implemented in appropriate combinations.

Explanation has been given regarding examples of the present invention; however, the present invention is not limited by the above, and obviously various other modifications may be implemented within a range not departing from the spirit of the present invention.

The disclosure of Japanese Patent Application No. 2014-205863, filed on Oct. 6, 2014, is incorporated in its entirety by reference herein.

All cited documents, patent applications and technical standards mentioned in the present specification are incorporated by reference in the present specification to the same extent as if the individual cited document, patent application, or technical standard was specifically and individually indicated to be incorporated by reference.

What is claimed is:

1. A vehicle hood structure comprising:
a hood outer panel; and
a hood inner panel made from a resin, the hood inner panel being disposed at a hood lower side of the hood outer panel and being joined to the hood outer panel, the hood inner panel including:
  a general portion having a general face facing the hood outer panel;
  a plurality of ribs projecting out from the general portion toward the hood outer panel and extending along the general face, the plurality of ribs being set at intervals in either a hood width direction or a hood front-rear direction; and
  a plurality of weakened portions formed in each of the plurality of ribs, each of the plurality of weakened portions being set at an interval along a vertical direction of each of the plurality of ribs, each of the plurality of weakened portions extending along a longitudinal direction of the plurality of ribs, each of the plurality of weakened portions including elongated holes formed by penetrating each of the plurality of ribs to form slit-shaped weakened portions, the slit-shaped weakened portions having a length direction in the longitudinal direction of the plurality of ribs, wherein
the plurality of ribs of the hood inner panel are free from contact with the hood outer panel.

2. The vehicle hood structure of claim 1, wherein:
the plurality of the weakened portions are also set at an interval along the longitudinal direction of the plurality of ribs; and
intervals between the plurality of weakened portions forming rows along the longitudinal direction of the ribs are set such that an interval between upper side weakened portions set relatively on a hood upper side is shorter than an interval between lower side weakened portions set relatively on a hood lower side.

3. The vehicle hood structure of claim 1, wherein the plurality of ribs extend along the hood front-rear direction.

4. The vehicle hood structure of claim 1, wherein a vertical direction leading end portion of the plurality of ribs is formed with a curved face forming a semicircular protrusion having a diameter of a plate thickness of the plurality of ribs.

5. The vehicle hood structure of claim 1, wherein:
the hood inner panel is made from fiber reinforced plastic; and
reinforcing fibers in the general portion are arrayed randomly along the general face, and reinforcing fibers in the plurality of ribs are arrayed along the vertical direction of the plurality of ribs.

* * * * *

UNITED STATES PATENT AND TRADEMARK OFFICE
CERTIFICATE OF CORRECTION

PATENT NO. : 9,616,842 B2
APPLICATION NO. : 14/857043
DATED : April 11, 2017
INVENTOR(S) : Koki Ikeda et al.

It is certified that error appears in the above-identified patent and that said Letters Patent is hereby corrected as shown below:

On the Title Page

Item (73) Assignee:, change "KABUHSIKI" to --KABUSHIKI--.

Signed and Sealed this
First Day of August, 2017

Joseph Matal
*Performing the Functions and Duties of the*
*Under Secretary of Commerce for Intellectual Property and*
*Director of the United States Patent and Trademark Office*